US012167322B2

(12) United States Patent
Nakahira et al.

(10) Patent No.: US 12,167,322 B2
(45) Date of Patent: Dec. 10, 2024

(54) WIRELESS TERMINAL STATION DEVICE, MANAGEMENT STATION DEVICE, WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Ryota Shiina, Musashino (JP); Kazutaka Hara, Musashino (JP); Tomohiro Taniguchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 409 days.

(21) Appl. No.: 17/632,860

(22) PCT Filed: Aug. 9, 2019

(86) PCT No.: PCT/JP2019/031633
§ 371 (c)(1),
(2) Date: Feb. 4, 2022

(87) PCT Pub. No.: WO2021/028966
PCT Pub. Date: Feb. 18, 2021

(65) Prior Publication Data
US 2022/0338103 A1 Oct. 20, 2022

(51) Int. Cl.
*H04W 48/16* (2009.01)
*H04W 24/10* (2009.01)

(52) U.S. Cl.
CPC .......... *H04W 48/16* (2013.01); *H04W 24/10* (2013.01)

(58) Field of Classification Search
CPC ..... H04W 16/32; H04W 24/08; H04W 24/10; H04W 48/16; H04W 48/18; H04W 88/06; H04W 92/18
See application file for complete search history.

(56) References Cited

U.S. PATENT DOCUMENTS 11,438,736 B2 * 9/2022 Fehrenbach ............ H04W 4/08
2005/0014515 A1 * 1/2005 Suzuki ................ H04W 36/324
455/456.1

(Continued)

FOREIGN PATENT DOCUMENTS

JP 2007135121 A * 5/2007
JP 20104385 A 1/2010

(Continued)

OTHER PUBLICATIONS

Tsutsui JP2007135121A publication date May 31, 2007 (Year: 2007).*

(Continued)

*Primary Examiner* — Wutchung Chu
(74) *Attorney, Agent, or Firm* — Harness, Dickey & Pierce, P.L.C.

(57) ABSTRACT

A radio terminal station device includes a communication unit, an information acquisition unit, a threshold calculation unit, a detection unit, and a system selection unit. The communication unit selects any one of a plurality of different communication systems and performs a radio communication. The information acquisition unit acquires information including a communication state of the radio terminal station device and at least communication states of other radio terminal station devices. The threshold calculation unit calculates a threshold value for detecting deterioration of the communication state of the radio terminal station device. The detection unit detects the deterioration of the communication state of a communication system used by the radio (Continued)

terminal station device. The system selection unit selects an optimal communication system from among the communication systems used by the other radio terminal station devices when the deterioration of the communication state of the communication system of the radio terminal station device is detected. Thus, it is possible to maintain favorable communication quality.

19 Claims, 12 Drawing Sheets

(56) References Cited

U.S. PATENT DOCUMENTS

| | | |
|---|---|---|
| 2009/0316661 A1 | 12/2009 | Tachikawa et al. |
| 2010/0029263 A1 | 2/2010 | Senoo et al. |
| 2010/0172322 A1 | 7/2010 | Yokota |
| 2010/0317338 A1 | 12/2010 | Ohsawa |
| 2014/0089377 A1* | 3/2014 | Kurihara ............. G06F 11/3058 709/202 |
| 2015/0230113 A1* | 8/2015 | Zhang ................ H04L 5/0035 370/252 |
| 2018/0167972 A1* | 6/2018 | Egner ................ H04W 72/541 |
| 2020/0275413 A1* | 8/2020 | Zhang ................ H04W 80/02 |
| 2021/0028828 A1* | 1/2021 | Kurras ................ H04B 7/0413 |
| 2021/0306043 A1* | 9/2021 | Damnjanovic ...... H04B 7/0626 |
| 2022/0095190 A1* | 3/2022 | Aio ...................... H04W 88/12 |

FOREIGN PATENT DOCUMENTS

| | | | |
|---|---|---|---|
| JP | 2010004385 A * | 1/2010 | ........ H04W 36/0011 |
| JP | 201041101 A | 2/2010 | |
| JP | 201045757 A | 2/2010 | |
| JP | 201595838 A | 5/2015 | |
| WO | WO-2009099033 A1 | 8/2009 | |

OTHER PUBLICATIONS

Tachikawa et al. JP2010004385A publication date Jan. 7, 2010 (Year: 2010).*

Aleksandar Damnjanovic et al., "A survey on 3GPP heterogeneous networks", IEEE Wireless Communications, vol. 18, No. 3, 2011 pp. 10-21.

* cited by examiner

Fig. 3

(EXAMPLE OF REPORT OF RADIO TERMINAL STATION 102-1(A))

| AREA | COMMUNICATION SYSTEM | COMMUNICATION STATE | | | | | OTHER (POSITION INFORMATION, APPLICATIONS, AND LIKE) |
|---|---|---|---|---|---|---|---|
| | | RECEIVED POWER | SNR | THROUGHPUT | DELAY | ... | |
| AREA 104(A) | SYSTEM m | −70 dBm | 15 dB | 10 Mbps | 2 ms | ... | ... |
| AREA 104(A) | SYSTEM 1 | −75 dBm | ... | ... | ... | ... | ... |
| AREA 104(A) | SYSTEM 2 | −65 dBm | ... | ... | ... | ... | ... |
| ... | ... | ... | ... | ... | ... | ... | ... |

Fig. 5

(EXAMPLE OF INFORMATION OF OTHER STATIONS)

| AREA | RADIO TERMINAL STATION ID | COMMUNICATION SYSTEM | COMMUNICATION STATE ||||| OTHER (POSITION INFORMATION, APPLICATIONS, AND LIKE) |
| | | | RECEIVED POWER | SNR | THROUGHPUT | DELAY | ... | |
|---|---|---|---|---|---|---|---|---|
| AREA 104(A) | 1(A) | SYSTEM m | -70 dBm | 15 dB | 10 Mbps | 2 ms | ... | ... |
| AREA 104(A) | 2(A) | SYSTEM 2 | -75 dBm | 10 dB | 5 Mbps | 1 ms | ... | ... |
| AREA 104(A) | n(A) | SYSTEM 1 | -65 dBm | 20 dB | 15 Mbps | 3 ms | ... | ... |
| ... | ... | ... | ... | ... | ... | ... | ... | |

Fig. 6

(EXAMPLE OF THRESHOLD VALUE OF COMMUNICATION SYSTEM IN USE)

| | THRESHOLD VALUE | | | |
|---|---|---|---|---|
| RECEIVED POWER | SNR | THROUGHPUT | DELAY | ... |
| −80 dBm | 10 dB | 8 Mbps | 2 ms | ... |

Fig. 12

(EXAMPLE OF REPORT OF MANAGEMENT DEVICE 106)

| AREA | RADIO TERMINAL STATION ID | COMMUNICATION SYSTEM | COMMUNICATION STATE | | | | | OTHER (POSITION INFORMATION, APPLICATIONS, AND LIKE) |
|---|---|---|---|---|---|---|---|---|
| | | | RECEIVED POWER | SNR | THROUGHPUT | DELAY | ... | |
| AREA 104(A) | 1(A) | SYSTEM m | -70 dBm | 15 dB | 10 Mbps | 2 ms | ... | ... |
| AREA 104(A) | 2(A) | SYSTEM 2 | -75 dBm | 10 dB | 5 Mbps | 1 ms | ... | ... |
| AREA 104(A) | n(A) | SYSTEM 1 | -65 dBm | 20 dB | 15 Mbps | 3 ms | ... | ... |
| AREA 104(C) | 1(C) | SYSTEM 2 | -73 dBm | 12 dB | 8 Mbps | 1 ms | ... | ... |
| AREA 104(C) | 2(C) | SYSTEM j | -60 dBm | 25 dB | 20 Mbps | 1 ms | ... | ... |
| ... | ... | ... | ... | ... | ... | ... | ... | |

WIRELESS TERMINAL STATION DEVICE, MANAGEMENT STATION DEVICE, WIRELESS COMMUNICATION SYSTEM AND WIRELESS COMMUNICATION METHOD

CROSS-REFERENCE TO RELATED APPLICATIONS

This application is a 371 U.S. National Phase of International Application No. PCT/JP2019/031633 filed on Aug. 9, 2019. The entire disclosure of the above application is incorporated herein by reference.

TECHNICAL FIELD

The present disclosure relates to a radio terminal station device, a management station device, a radio communication system, and a radio communication method in a heterogeneous network in which a plurality of communication systems are mixed.

BACKGROUND ART

Due to the explosive widespread use of radio terminal station devices, such as smartphones, in recent years, radio traffic continuously increases. In order to accommodate the radio traffic, not only are different types of communication systems, such as mobile networks and radio local area networks (LANs), installed in various locations, but also the transmission rate in each communication system increases.

Furthermore, in addition to the smartphones, a wide variety of radio terminal station devices such as an IoT (Internet of Things) terminals are also increasing, and a communication system is deployed in accordance with various requirements. In a heterogeneous network environment in which a plurality of such communication systems are mixed, research and development has been actively performed on parameter setting of each communication system, selection of an optimal communication system, and the like (for example, see NPL 1).

CITATION LIST

Non Patent Literature

NPL 1: Damnjanovic, Aleksandar, et al. "A survey on 3GPP heterogeneous networks." IEEE Wireless Communications 18.3(2011): 10-21.

SUMMARY OF THE INVENTION

Technical Problem

As a selection method of a communication system in a heterogeneous network, there are a centralized control and an autonomous distributed control. In the centralized control, a management station device on a network controls a communication system selected by each radio terminal station device in consideration of the entirety of an area. In the autonomous distributed control, the radio terminal station device individually selects a radio communication system.

In the centralized control, it is possible to recognize a situation of a radio environment in the entire area and select, in a centralized manner, an optimal communication system. However, the load on collecting information of the radio environment, the calculation time for selecting the optimal communication system, control cost for controlling each radio terminal station device, and the like are increased.

On the other hand, in the autonomous distribution control, the radio terminal station device selects the communication system while recognizing the situation of the surrounding environment. Thus, the load is reduced in comparison to the centralized control. However, information that can be recognized by the radio terminal station device itself is limited, and it is more difficult to select the optimal communication system than the centralized control.

An object of the present disclosure is to provide, in a heterogeneous network in which a plurality of communication systems are mixed, a radio terminal station device, a management station device, a radio communication system, and a radio communication method capable of maintaining favorable communication quality in a manner that communication states of a plurality of radio terminal station devices are shared, and the optimal communication system is selected based on the communication states of other radio terminal station devices when the communication state of the station deteriorates.

Means for Solving the Problem

According to the present disclosure, a radio terminal station device includes a communication unit that selects any one of a plurality of different communication systems and performs a radio communication with a radio base station device, an information acquisition unit that acquires a communication state of a communication system of the plurality of different communication systems used by the radio terminal station device and information including at least communication states of communication systems of the plurality of different communication systems used by other radio terminal station devices, a threshold calculation unit that calculates a threshold value for detecting deterioration of the communication state of the communication system used by the radio terminal station, a detection unit that monitors the communication state of the communication system used by the radio terminal station device and compares the communication state of the communication system used by the radio terminal station device that is monitored with the threshold value to detect the deterioration of the communication state of the communication system used by the radio terminal station device, and a system selection unit that selects, when the detection unit detects the deterioration of the communication state of the communication system used by the radio terminal station device, an optimal communication system from among the communication systems used by the other radio terminal station devices acquired by the information acquisition unit and switches the communication system used by the radio terminal station device to the optimal communication system that is selected.

According to the present disclosure, a management station device includes a communication unit that connects, via a network, to a plurality of radio base station devices that use a plurality of different communication systems to accommodate a plurality of radio terminal station devices, and an information distribution unit that transfers, when a request of requesting information regarding a communication state of another radio terminal station device of the plurality of radio terminal station devices is received from a radio terminal station device of the plurality of radio terminal station devices, the request to the other radio terminal station device, and, transmits, when a report of information including at least the communication state of the other radio terminal station device that is returned by the other radio terminal station device that is received the request is received, the report to the radio terminal station device that is a transmission source of the request.

According to the present disclosure, there is provided a radio communication system that comprises a heterogeneous network including the radio terminal station device, in which the radio terminal station device selects, when deterioration of a communication state of a communication system used by the radio terminal station device is detected, an optimal communication system from among communication systems used by other radio terminal station devices based on information including at least communication states of the communication systems used by the other radio terminal station devices, and switches the communication system used by the radio terminal station device to the optimal communication system that is selected.

According to the present disclosure, there is provided a radio communication method in a radio communication system that comprises a heterogeneous network including the radio terminal station device, and the radio communication method includes, by the radio terminal station device, selecting, when deterioration of a communication state of a communication system used by the radio terminal station device is detected, an optimal communication system from among communication systems used by other radio terminal station devices based on information including at least communication states of the communication systems used by the other radio terminal station devices, and switching the communication system used by the radio terminal station device to the optimal communication system that is selected.

Effects of the Invention

According to the present disclosure, in a heterogeneous network in which a plurality of communication systems are mixed, the radio terminal station device, the management station device, the radio communication system, and the radio communication method are capable of maintaining favorable communication quality in a manner that communication states of a plurality of radio terminal station devices are shared, and the optimal communication system is selected based on the communication states of other radio terminal station devices when the communication state of the radio terminal station device deteriorates.

BRIEF DESCRIPTION OF DRAWINGS

FIG. 3 is a diagram illustrating an example of a report returned by a radio terminal station.

FIG. 5 is a diagram illustrating an example of listed information of other stations.

FIG. 6 is a diagram illustrating an example of a threshold value calculated by a threshold calculation unit.

FIG. 12 is a diagram illustrating an example of a report created by the management device.

DESCRIPTION OF EMBODIMENTS

Hereinafter, embodiments of a radio terminal station device, a management station device, a radio communication system, and a radio communication method according to the present disclosure will be described with reference to the drawings. In the following embodiments, the management station device is referred to as a management device, the radio base station device is referred to as a radio base station, and the radio terminal station device is referred to as a radio terminal station.

Figure 1:
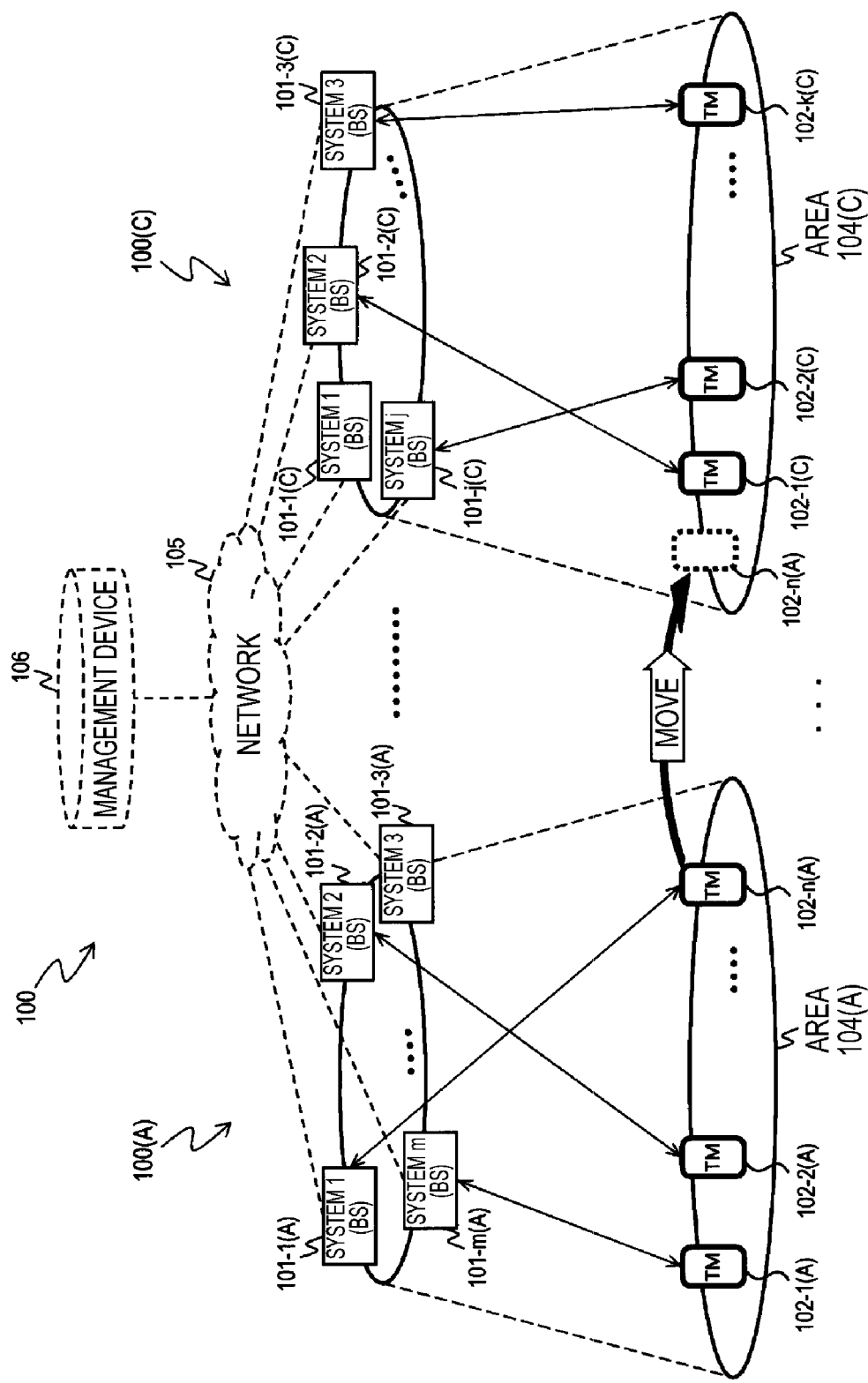
FIG. 1 is a diagram illustrating an example of a heterogeneous network common in embodiments.

FIG. 1 illustrates an example of a heterogeneous network 100 common in the embodiments. In the example in FIG. 1, a plurality of heterogeneous networks 100 from a heterogeneous network 100(A) covering an area 104(A) to a heterogeneous network 100(C) covering an area 104(C) are disposed. A plurality of radio base stations 101 corresponding to different communication systems are disposed in each area 104. Each radio base station 101 is connected to a management device 106 via a network 105. A plurality of radio terminal stations 102 are used in each area 104. The radio terminal station 102 connected to any communication system has a function of sharing a communication state between the radio terminal station 102 and the radio base station 101, with the surrounding radio terminal stations 102.

In FIG. 1, m pieces (m is a positive integer) of radio base station 101-1(A), radio base station 101-2(A), radio base station 101-3(A), . . . , and radio base station 101-$m$(A) respectively corresponding to m types of different communication systems (in FIG. 1, described as a system 1, a system 2, a system 3, . . . , and a system m) are disposed in the area 104(A). In FIG. 1, the radio base station is described as BS. For example, a block of the "system 1 (BS)" indicates the radio base station 101-1(A).

Then, n pieces (n is a positive integer) of radio terminal station 102-1(A), radio terminal station 102-2(A), . . . , and radio terminal station 102-$n$(A) are used in the area 104(A). In FIG. 1, the radio terminal station is described as TM. In the example in FIG. 1, the radio terminal station 102-1(A) is connected to the radio base station 101-$m$(A) corresponding to the system m. The radio terminal station 102-2(A) is connected to the radio base station 101-2(A) corresponding to the system 2. The radio terminal station 102-$n$(A) is connected to the radio base station 101-1(A) corresponding to the system 1.

Similarly, j pieces (j is a positive integer) of radio base station 101-1(C), radio base station 101-2(C), radio base station 101-3(C), . . . , and radio base station 101-$j$(C) respectively corresponding to j types of different communication systems (in FIG. 1, described as a system 1, a system 2, a system 3, . . . , and a system j) are disposed in the area 104(C).

Then, k pieces (k is a positive integer) of radio terminal station 102-1(C), radio terminal station 102-2(C), . . . , and radio terminal station 102-$k$(C) are used in the area 104(C). In the example in FIG. 1, the radio terminal station 102-1(C) is connected to the radio base station 101-2(C) corresponding to the system 2. The radio terminal station 102-2(C) is connected to the radio base station 101-*j*(C) corresponding to the system j. The radio terminal station 102-*k*(C) is connected to the radio base station 101-3(C) corresponding to the system 3. In FIG. 1, the area 104(A) and the area 104(C) are separately illustrated without overlapping each other, but the areas 104 may overlap each other. As illustrated in FIG. 1, when the radio terminal station 102-*n*(A) moves from the area 104(A) to the area 104(C), the radio terminal station 102-*n*(A) selects the radio base station 101 of the optimal communication system from the plurality of radio base stations 101 in the area 104(C) as a movement destination, and then is connected to the selected radio base station.

Here, in the following description, when common description will be made for the m pieces of radio base stations being the radio base station 101-1(A) to the radio base station 101-*m*(A) in the area 104(A) and the j pieces of radio base stations being the radio base station 101-1(C) to the radio base station 101-*j*(C) in the area 104(C), the "-number (alphabet)" in the latter half of the reference sign will be omitted, and the m pieces of radio base stations and the j pieces of radio base stations will be described as a radio base station 101. Similarly, when common description will be made for the n pieces of radio terminal stations being the radio terminal station 102-1(A) to the radio terminal station 102-*n*(A) in the area 104(A), and the radio terminal station 102-1(C) to the radio terminal station 102-*k*(C) in the area 104(C), the "-number (alphabet)" in the latter half of the reference sign will be omitted, and the n pieces of radio terminal stations and the k pieces of radio terminal stations will be described as a radio terminal station 102. When common description will be made for the area 104(A) and the area 104(C), the areas will be described as an area 104. The "-number" in the latter half of the reference sign of the radio base station 101 means a number indicating the type of communication system corresponding to this radio base station 101. The radio base station 101-1(A) in the area 104(A) and the radio base station 101-1(C) in the area 104(C) are radio base stations 101 corresponding to the communication system of the same system 1. The (alphabet) at the ends of the reference signs of the radio base station 101 and the radio terminal station 102 indicates the corresponding area 104.

In FIG. 1, each radio terminal station 102 has a function of distributing a communication state between the radio terminal station 102 and the radio base station 101 to other radio terminal stations 102. The radio terminal station 102 has functions of constantly monitoring the communication state between the radio terminal station 102 and the radio base station 101 and switching the radio base station to the radio base station 101 of another communication system when a parameter indicating the communication state does not satisfy a threshold value separately calculated. Thus, the radio terminal station 102 acquires the communication states of other radio terminal stations 102 and shares the communication states between a plurality of radio terminal stations 102. Thus, each of the radio terminal stations 102 can determine the switchable communication system and select the optimal communication system for the application of the radio terminal station 102.

Here, three cases as follows are considered as a configuration for sharing information regarding the communication state between the plurality of radio terminal stations 102.
(1) Case of communicating between the radio terminal stations 102: the radio terminal station 102 directly acquires the communication state from another radio terminal station 102 by using a radio ad-hoc network (network in which the radio terminal stations 102 can directly communicate with each other) formed with the surrounding radio terminal stations 102.
(2) Case of passing through the radio base station 101: by temporarily using a radio interface other than the communication system currently used by the radio terminal station 102 (using together with the current communication system), the radio terminal station 102 is connected to another radio terminal station 102 via the radio base station 101 including the above radio interface and acquires the communication state. Alternatively, the radio base station 101 may integrate and manage communication states of the radio terminal stations 102 accommodated subordinate to the radio base station 101, and the radio terminal station 102 may acquire the communication state of the other radio terminal station 102 from the radio base station 101.
(3) Case of passing through the management device 106: the radio terminal station 102 connects to another radio terminal station 102 via the management device 106 to which the radio terminal station 102 is connected via the radio base station 101 and a core network 105 by using the communication system currently used by the radio terminal station 102, and then acquires the communication state. Alternatively, the management device 106 may integrate and manage the communication states of each of the radio terminal stations 102 for each area, and the radio terminal station 102 may acquire the communication states of the other radio terminal stations 102 from the management device 106.

The configuration (1) will be describe below as a first embodiment. The configuration (2) will be described below as a second embodiment. The configuration (3) will be described below as a third embodiment.

First Embodiment

In the first embodiment, a method in which the radio terminal station 102 directly acquires the communication state from other radio terminal stations 102 by using a radio ad-hoc network formed with the surrounding radio terminal stations 102 will be described.

Figure 2:
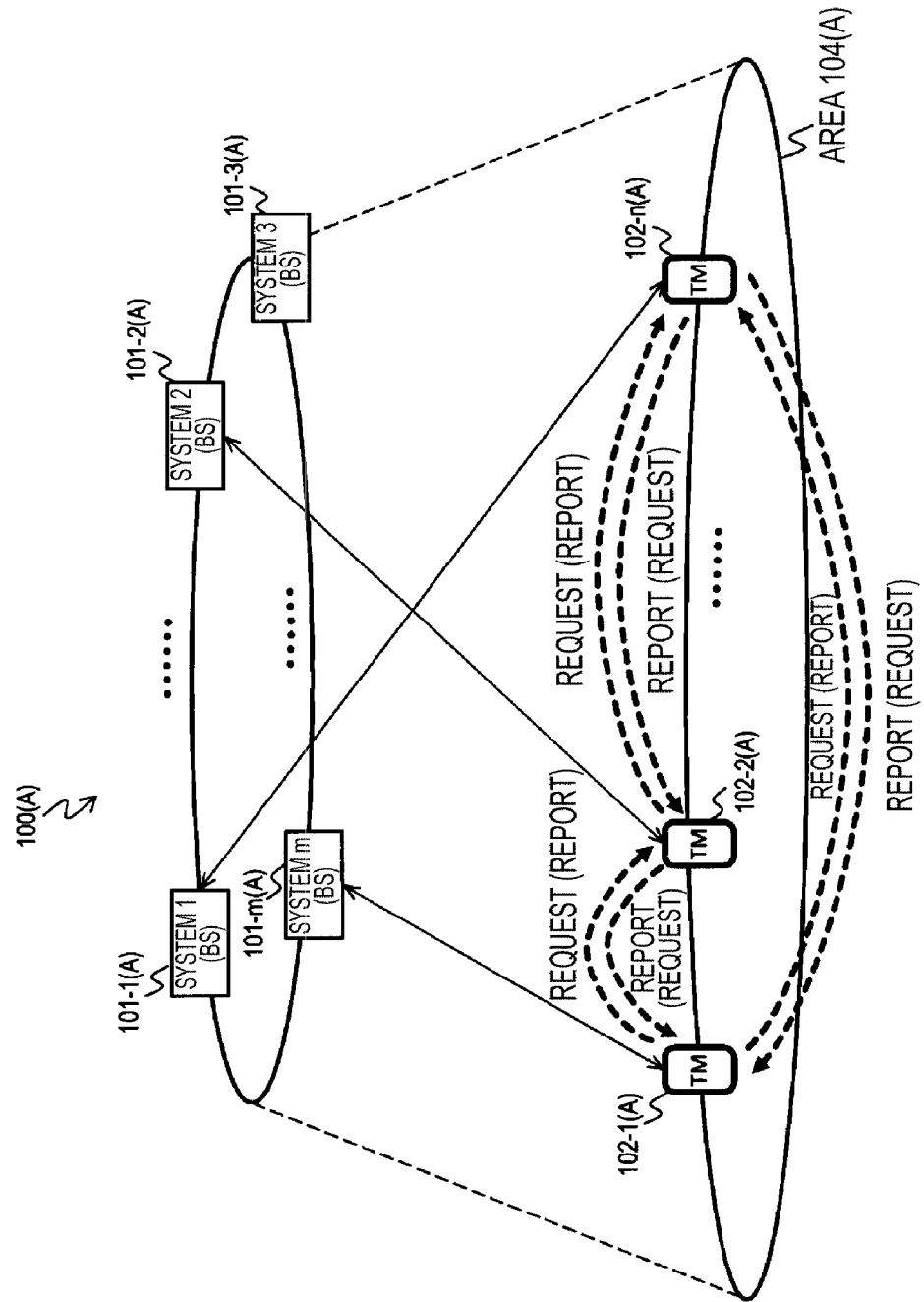
FIG. 2 is a diagram illustrating an example of the heterogeneous network according to a first embodiment.

FIG. 2 illustrates an example of a heterogeneous network 100(A) according to the first embodiment. The heterogeneous network 100(A) in FIG. 2 corresponds to the heterogeneous network 100(A) described with reference to FIG. 1. In FIG. 2, a plurality of radio terminal stations 102 in the area 104(A) are connected with the radio ad-hoc network to share the communication states. For example, specifically, the radio ad-hoc network between terminals, which is known as Bluetooth (trade name), Wi-Fi Direct (trade name), and the like, can be used.

Here, the communication between the radio terminal stations 102 may be a method using the same radio interface that is predetermined between the radio terminal stations 102, or a method using a radio interface used by the radio terminal station 102 that wants to transmit a request.

In FIG. 2, the radio terminal station 102-1(A) connected to the radio base station 101-*m*(A) by the communication system of the system m acquires the communication state between the radio base station 101-*m*(A) and the radio terminal station 102-1(A). Similarly, the radio terminal station 102-2(A) connected to the radio base station 101-2 (A) by the communication system of the system 2 acquires the communication state between the radio base station 101-2(A) and the radio terminal station 102-2(A). The radio terminal station 102-*n*(A) connected to the radio base station 101-1(A) by the communication system of the system 1 acquires the communication state between the radio base station 101-1(A) and the radio terminal station 102-n(A). In this manner, the radio terminal station 102-1(A), the radio terminal station 102-2(A), and the radio terminal station 102-n(A) acquire and store the communication states of the respective radio terminal stations. As indicated by a dotted line in FIG. 2, the radio terminal station 102 transmits a request of requesting the communication state of the other radio terminal stations 102. The other radio terminal station 102 receiving the request transmits a report including the communication state of the other radio terminal station 102, the communication system used by the other radio terminal station 102, and the like, to the radio terminal station 102 that is a transmission source of the request.

For example, in FIG. 2, the radio terminal station 102-1 (A) transmits a request of requesting the communication state to the radio terminal station 102-2(A) and receives a report from the radio terminal station 102-2(A). Conversely, the radio terminal station 102-2(A) transmits a request of requesting the communication state to the radio terminal station 102-1(A) and receives a report from the radio terminal station 102-1(A). Similarly, the radio terminal station 102-1(A) transmits a request of requesting the communication state to the radio terminal station 102-n(A) and receives a report from the radio terminal station 102-n(A). Similarly, a request is transmitted and a report is received between the radio terminal station 102-2(A) and the radio terminal station 102-n(A) and between the radio terminal station 102-1(A) and the radio terminal station 102-n(A).

In this manner, in the first embodiment, the plurality of radio terminal stations 102 in the area 104(A) cooperate to share the communication states with each other. The radio terminal station 102 can select the optimal communication system based on the information including at least the communication states of the other radio terminal stations 102 when the communication state of the radio terminal station 102 deteriorates. Thus, it is possible to maintain the favorable communication quality. Here, the communication state is, for example, information such as received power, the SNR, throughput, and the delay.

FIG. 3 illustrates an example of a report returned by the radio terminal station 102-1(A). FIG. 3 illustrates that the radio terminal station 102-1(A) performs a communication using the communication system m in the area 104(A), and the received power of −70 dBm, the signal-to-noise ratio (SNR) of 15 dB, the throughput of 10 Mbps, and the delay of 2 ms are obtained. Although, the report basically includes the communication state related to the communication system in use, as illustrated in FIG. 3, the report may include information (received power in the example in FIG. 3) obtained from a beacon or the like transmitted by the radio base station 101 of the system 1 and the system 2 which are not used in communication by the radio terminal station 102-1(A). Furthermore, in addition to the communication state, information (identifier, communication system in use, used application, position information, and the like) regarding the radio terminal station 102 may be included in the report.

Radio Terminal Station 102

Figure 4:
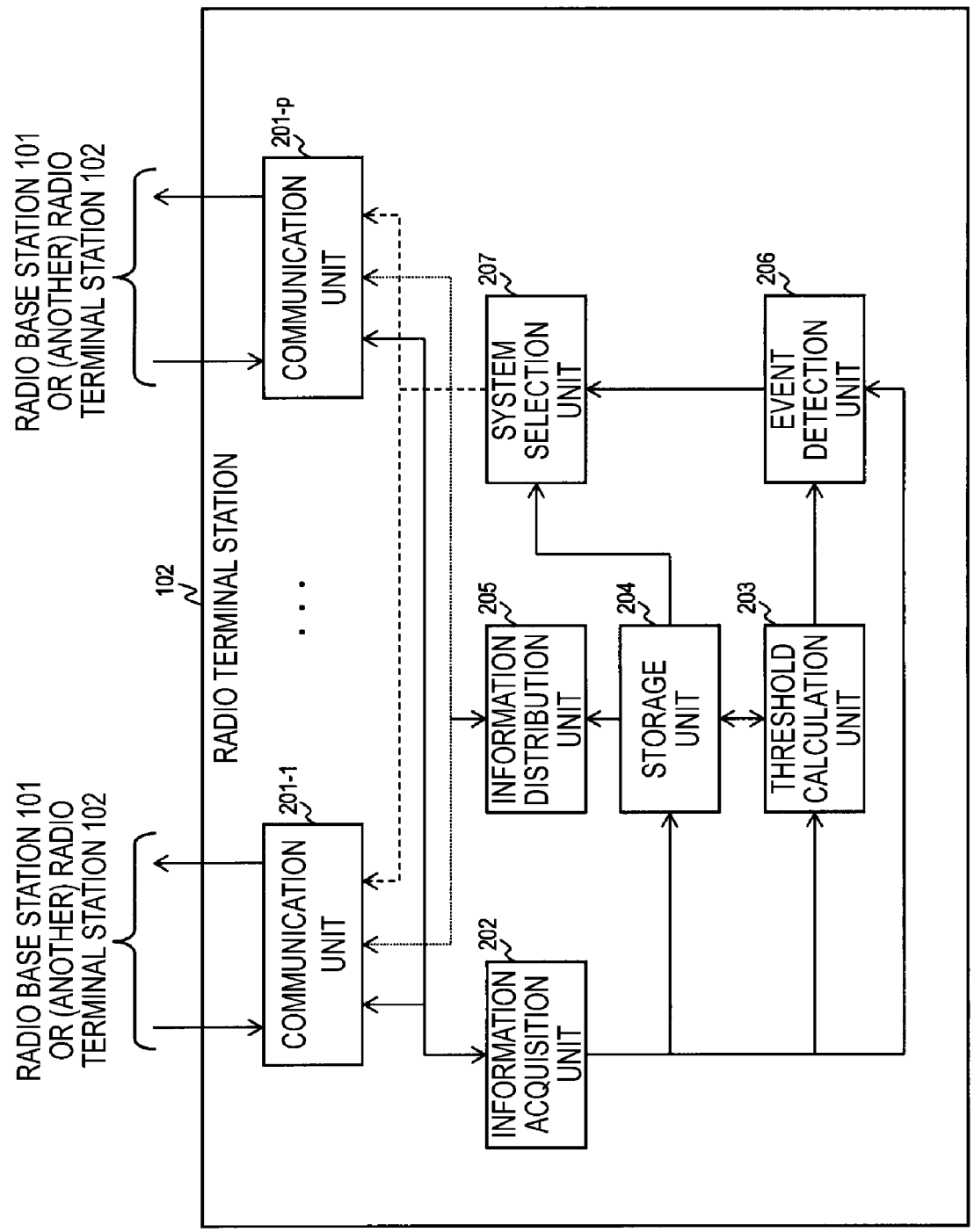
FIG. 4 is a diagram illustrating an example of a radio terminal station common in the embodiments.

FIG. 4 illustrates an example of the radio terminal station 102 common in the embodiments. In FIG. 4, the radio terminal station 102 includes a plurality of communication units 201 (communication units 201-1 to 201-p (p is a positive integer)) corresponding to a plurality of different types of communication systems, an information acquisition unit 202, a threshold calculation unit 203, a storage unit 204, an information distribution unit 205, an event detection unit 206, and a system selection unit 207. In FIG. 4, functional blocks with which a typical radio terminal station is equipped are omitted. The radio base station 101 that is to be connected first when the radio terminal station 102 enters into any area 104 may be any radio base station 101 using any communication system.

The communication units 201 correspond to the plurality of different communication systems and communicate with the radio base station 101 or the other radio terminal stations 102. The communication unit 201 turns on/off a radio communication function according to a control signal output by the system selection unit 207 and to allow communication with the communication system corresponding to the radio base station 101 that is a connection destination. For example, the communication unit 201 to which a control signal for causing the radio communication function of a communication system to turn on is input from the system selection unit 207 is set to perform radio communication with the radio base station 101 by the above communication system. Conversely, the communication unit 201 to which a control signal for causing the radio communication function to turn off is input is set not to perform radio communication by the above communication system. In this manner, the communication unit 201 can turn on/off the radio communication function of each communication system by the control signal input from the system selection unit 207, and thus select the communication system corresponding to the radio base station 101 that is the connection destination. As described with reference to FIG. 2, when the radio terminal station directly performs a communication of a request or a report of the communication states with the other surrounding radio terminal station 102 that can be connected via the radio ad-hoc network, the radio terminal station 102 can appropriately perform a communication with the common radio interface in parallel with a normal communication with the radio base station 101. Here, in FIG. 4, each of the plurality of communication units 201 of the communication unit 201-1 to the communication unit 201-p may have a communication function compatible with a plurality of different types of communication systems. For example, the type of corresponding communication system may differ between the communication unit 201-1 and the communication unit 201-p.

When the radio terminal station 102 is connected to the radio base station 101, the information acquisition unit 202 acquires the communication state of the radio terminal station 102 from the communication unit 201 connected to the radio base station 101. Then, the information acquisition unit outputs the acquired communication state to the storage unit 204, the threshold calculation unit 203, and the event detection unit 206. The information acquisition unit 202 acquires a report including at least the communication states of the other surrounding radio terminal stations 102 that can perform a direct communication, via the radio ad-hoc network. Then, the information acquisition unit outputs the acquired report to the storage unit 204 and the threshold calculation unit 203. In a case where the second embodiment described below, an information acquisition unit 202 transmits a request to another radio terminal station 102 via the radio base station 101, and receives a report from the other radio terminal station 102 via the radio base station 101.

The threshold calculation unit 203 calculates a threshold value of the communication state (received power, SNR, throughput, delay, and the like) for switching the communication system, based on the type of application used by the radio terminal station 102 or the like. For example, when an application (for example, video distribution or the like) requiring high-speed communication is used, the threshold calculation unit 203 sets a throughput threshold value to be increased. As another example, when the radio terminal station 102 is a device such as an IoT, or the application may be executed in low speed communication, the threshold calculation unit 203 sets the threshold value of the received power, the SNR, the throughput, or the like to be reduced. Alternatively, in the case where an application having high real-time performance such as a telephone call, the threshold calculation unit 203 sets the delay threshold value to be small. The example of the threshold value of the communication state will be described below in detail. In this manner, the threshold calculation unit 203 calculates the threshold value of the communication state for switching the communication system, and outputs the calculated threshold value to the event detection unit 206 and the system selection unit 207.

In the storage unit 204, the communication state of the radio terminal station 102 and the communication state of another radio terminal station 102, which are acquired by the information acquisition unit 202, further, information (identifier of the radio terminal station 102, communication system in use, information regarding the used application, position information, and the like) regarding the radio terminal station 102 and the other radio terminal station 102 are associated and stored. The information of the radio terminal station 102 and the information of the other radio terminal station 102, which are recorded in the storage unit 204, are read by the threshold calculation unit 203, the information distribution unit 205, and the system selection unit 207. The storage unit 204 may store the threshold value calculated by the threshold calculation unit 203. For example, every time the application to be used (which may be a combination of a plurality of applications) is switched, the threshold calculation unit 203 can easily calculate the threshold value with reference to the previous list in accordance with the change of the application to be used by the storage unit 204 associating the application being used with the threshold value and accumulating in a list.

When the request of requesting the communication state of the radio terminal station 102 is received from another radio terminal station 102, the information distribution unit 205 reads the information of the radio terminal station 102 including the communication state of the radio terminal station 102 from the storage unit 204 to create a report regarding the radio terminal station 102 and then transmits the created report from the communication unit 201 to the other radio terminal station 102 that is a transmission source of the request.

The event detection unit 206 compares the communication state of the radio terminal station 102, which is output by the information acquisition unit 202 in real time, to the threshold value calculated by the threshold calculation unit 203 to detect whether a switching event indicating whether the communication system is to be switched occurs. For example, a switching event is generated when the value of the received power in the communication system in use is lower than the threshold value of the received power in the communication state set by the threshold calculation unit 203. Then, the switching event is output to the system selection unit 207. The switching event may include information indicating the type of detected communication state.

When the switching event is output from the event detection unit 206, the system selection unit 207 controls the communication unit 201 to switch the communication system. At this time, the system selection unit 207 selects the communication system that is the optimal switching destination, with reference to the information of the radio terminal station 102 and the information of other radio terminal stations 102 stored in the storage unit 204. The system selection unit 207 selects, for example, the communication system that satisfies a communication state required by the application used by the radio terminal station 102 from among the communication systems used by other radio terminal stations 102. For example, when the communication system that is the switching destination is the system 2, the system selection unit 207 outputs a control signal for causing the radio communication function corresponding to the system 2 to turn on, to the communication unit 201. In the example in FIG. 1, the radio terminal station 102-1(A) switches the connection destination from the radio base station 101-$m$(A) of the system m to the radio base station 101-2(A) of the system 2. A method of selecting the optimal communication system will be described below in detail.

FIG. 5 illustrates an example of list information of other radio terminal stations 102. In FIG. 5, information of other radio terminal stations 102, which is acquired by the information acquisition unit 202 and includes the communication states of the other radio terminal stations 102 are listed and stored in the storage unit 204. In the example in FIG. 5, pieces of information such as the area 104, the identifier (ID) of the radio terminal station 102, the type of communication system being used by the radio terminal station 102, the value of each parameter indicating the communication state, position information, and the used application are associated with each other. For example, in FIG. 5, it is understood that the radio terminal station 102-1(A) in the area 104(A) uses the communication system of the system m, the received power is −70 dBm, the SNR is 15 dB, the throughput is 10 Mbps, and the delay is 2 ms. Similarly, it is understood that the radio terminal station 102-2(A) in the area 104(A) uses the communication system of the system 2, the received power is −75 dBm, the SNR is 10 dB, the throughput is 5 Mbps, and the delay is 1 ms. Furthermore, it is understood that the radio terminal station 102-$n$(A) in the area 104(A) uses the communication system of the system 1, the received power is −85 dBm, the SNR is 20 dB, the throughput is 15 Mbps, and the delay is 3 ms. The system selection unit 207 illustrated in FIG. 4 selects the communication system that capable of maintaining the communication state requested by the application of the radio terminal station 102, with reference to the pieces of information of the other radio terminal stations 102 as illustrated in FIG. 5.

FIG. 6 illustrates an example of the threshold value calculated by the threshold calculation unit 203. The threshold value is a value for determining that the communication system may be switched to another communication system when the communication state (received power, SNR, throughput, delay, and the like) of the communication system being used by the radio terminal station 102 deteriorates. The threshold value is calculated based on the type of application used by the radio terminal station 102 and the like. In the example in FIG. 6, regarding the threshold value of the communication state required by the application used by the radio terminal station 102, the received power is set to be less than −80 dBm, the SNR is set to be less than 10 dB, the throughput is set to be less than 8 Mbps, and the delay is set to be equal to or greater than 2 ms. It is not necessary that the threshold value is set for all communication states. Depending on the application used by the radio terminal station 102, the threshold value of only one parameter may be set, or threshold values of a plurality of parameters may be set. For example, in the case where an application that requires large capacity communication in a streaming system such as video distribution, the threshold value of the throughput is set to be large, or, in the case where an application having high real-time performance such as a video call, the threshold value of the throughput is set to be large and the threshold value of the delay is set to be small. Alternatively, in the case where a low-delay communication application of a narrow band, such as a remote operation, the threshold value of the delay is set to be small. In the case where a power-saving communication application such as an IoT, the threshold value of the received power is set to be low.

Regarding a timing at which the threshold value is calculated, the threshold value may be calculated for each predetermined interval, and the threshold value is preferably calculated every time the application used by the radio terminal station 102 changes. Thus, it is possible to set an optimal threshold value depending on the application. When a plurality of applications are used, it is preferable that the maximum threshold value or the minimum threshold value among a plurality of threshold values respectively required by the plurality of applications is set to the threshold value. For example, in the case where the radio terminal station 102 in which a plurality of applications such as an application A and an application B are simultaneously used, when the threshold value of the throughput required by the application A is 10 Mbps, and the threshold value of the throughput required by the application B is 5 Mbps, the threshold value of the throughput is preferably set to 10 Mbps. Alternatively, when the parameters required by the plurality of applications are different from each other, for example, when the threshold value of the throughput required by the application A is 10 Mbps and the threshold value of the delay required by the application B is 2 ms, both the threshold value (10 Mbps) of the throughput and the threshold value (2 ms) of the delay are set. Thus, it is possible to select an optimal communication system depending on the used application.

Information such as which application the radio terminal station 102 is used or whether a plurality of applications are used, or requirements such as the throughput and the delay required by the application can be acquired from the system of the radio terminal station 102 or a higher application.

Here, in the example described above, the system selection unit 207 performs a control so as not to switch the communication system when the threshold value of the parameter required by the application is satisfied. The system selection unit may perform a control to switch the communication system when the communication state of the communication system in use is over the specification even though the threshold value of the parameter required by the used application is satisfied. For example, when the throughput of the communication system in use is 20 Mbps and the throughput required by the application in use is 1 Mbps, and when the communication system having the throughput of 2 Mbps is provided, the system selection unit 207 switches the communication system from the communication system having the throughput of 20 Mbps to the communication system having the throughput of 2 Mbps. Thus, it is possible to open the communication system having high throughput to the other radio terminal stations 102, and thus to effectively use the communication band.

Switching Example of Communication System

An example of switching the communication system will be described with reference to FIGS. 4, 5, and 6. Here, the description will be made on the assumption that the radio terminal station 102 uses the communication system of the system 3 that is not used by the other radio terminal stations 102 illustrated in FIG. 5, and the threshold value of the communication state in the system 3, which is required by the used application is a value illustrated in FIG. 6.

In this case, the threshold value of the throughput illustrated in FIG. 6 is 8 Mbps. Thus, when the threshold value of the throughput of the system 3 being used by the radio terminal station 102 becomes smaller than 8 Mbps, the event detection unit 206 determines that the communication state has deteriorated, and then issues a switching event. The system selection unit 207 that has received the switching event selects the communication system satisfying the threshold condition in FIG. 6, with reference to the pieces of information of the other radio terminal stations 102 illustrated in FIG. 5. Specifically, in FIG. 5, the received power (−65 dBm, −75 dBm, and −70 dBm) of the system 1, the system 2, and the system m is sufficiently higher than the threshold value (−80 dBm) of the received power in FIG. 6. Thus, the system selection unit 207 determines that any communication system can be selected for the received power. For the SNR, similarly, all the system 1, the system 2, and the system m satisfy the condition of the threshold value (10 dB) of the SNR. Thus, the system selection unit 207 determines that any communication system can be selected for the SNR. However, regarding the throughput of the system 1, the system 2, and the system m, the throughput of the system 2 is 5 Mbps and does not satisfy the threshold value (8 Mbps) of the throughput. Thus, the system selection unit 207 determines that it is not possible to select the system 2. Furthermore, regarding the delays (3 ms, 1 ms, and 2 ms) of the system 1, the system 2, and the system m, the delay of the system 1 is 3 ms and does not satisfy the threshold value (2 ms) of the delay. Thus, the system selection unit 207 determines that it is not possible to select the system 1. In this manner, the system selection unit 207 determines that the system m is only the system that is selectable among the pieces of information of other radio terminal stations 102 illustrated in FIG. 5, and selects the system m. Then, the system selection unit controls the communication unit 201 to switch the communication system to the system m.

Here, when a plurality of communication systems satisfying all of the threshold conditions required by the application are selectable, a communication system close to the threshold value required by the application may be selected. For example, when two communication systems in which all the conditions other than the throughput are equal and the throughput is 10 Mbps and 20 Mbps are selectable, and when the threshold value required by the application is 5 Mbps, the communication system having throughput of 10 Mbps, which is close to the threshold value of the throughput required by the application may be selected. Thus, it is possible to prevent the selection of the over-specification communication system. Alternatively, the system selection unit 207 may preferentially select the communication system of another radio terminal station 102 using the same application as the application used by the radio terminal station 102, with reference to the information regarding the application. Similarly, when a plurality of communication systems are selectable candidates, the system selection unit 207 may preferentially select the communication system of another radio terminal station 102 near the radio terminal station, for example, with reference to the position information. Also, a plurality of pieces of information such as the application and the position information may be combined.

In this manner, the radio terminal station 102 according to the present embodiment monitors the communication state of the radio terminal station 102. When the communication state does not satisfy the threshold value set depending on the used application, the communication system suitable for the used application is selected based on the information acquired from other radio terminal stations 102, and then performs switching to the selected communication system. Thus, it is possible to maintain the favorable communication quality.

Figure 7:
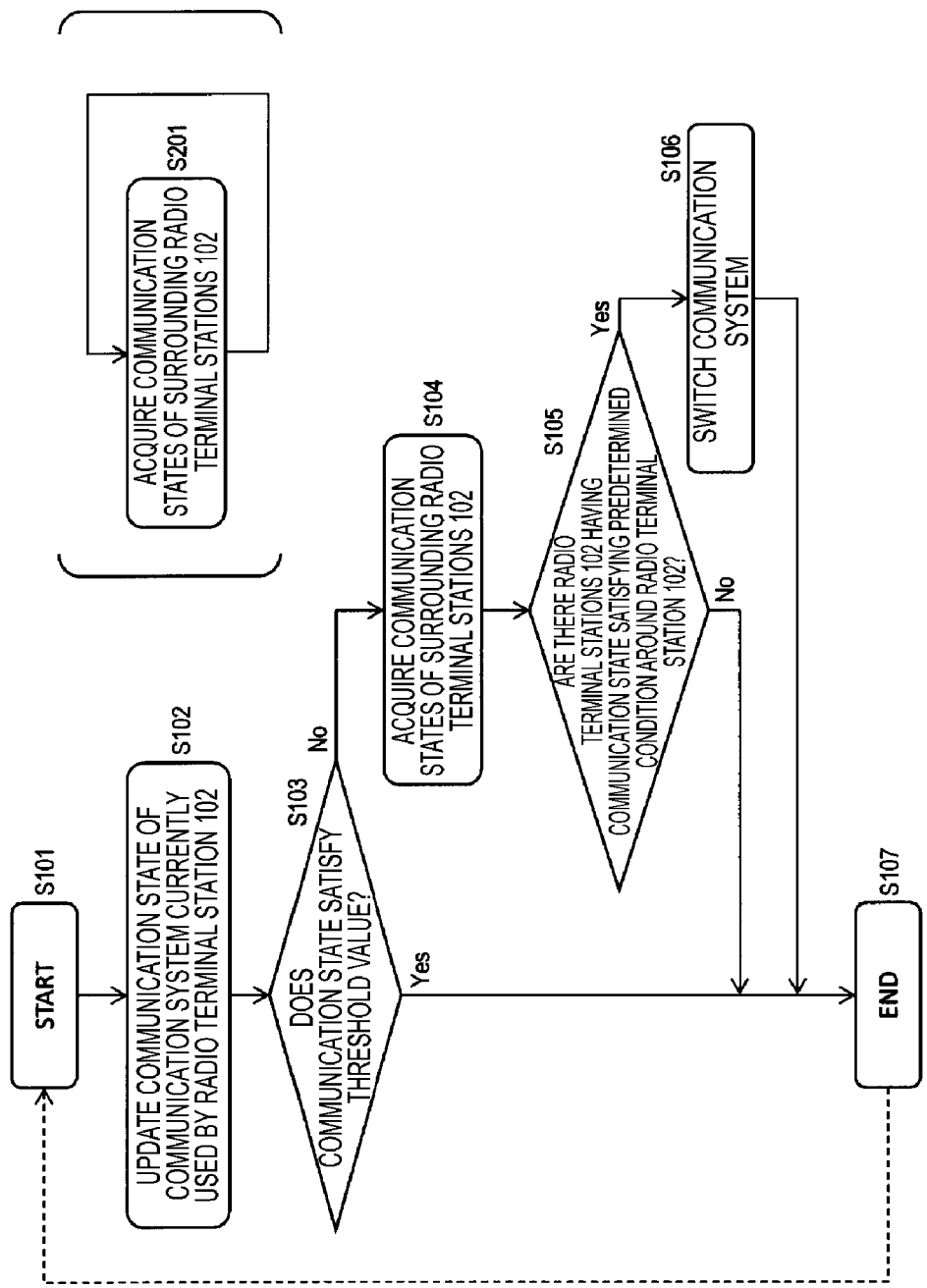
FIG. 7 is a diagram illustrating an example of a communication system switching procedure.

FIG. 7 illustrates an example of a communication system switching procedure. The processing illustrated in FIG. 7 is performed by the units of the radio terminal station 102 illustrated in FIG. 4.

In Step S101, the radio terminal station 102 starts processing of switching the communication system.

In Step S102, the information acquisition unit 202 in the radio terminal station 102 acquires the communication state of the radio terminal station 102 and updates the communication state of the communication system which is currently used.

In Step S103, the event detection unit 206 in the radio terminal station 102 determines whether the communication state of the radio terminal station 102 satisfies the threshold value calculated by the threshold calculation unit 203. When the communication state of the radio terminal station 102 satisfies the threshold value, the processing proceeds to Step S107. When the threshold value is not satisfied, the process proceeds to Step S104.

In Step S104, the information acquisition unit 202 in the radio terminal station 102 acquires the communication states of the surrounding radio terminal stations 102. Here, as illustrated in FIG. 2, the information acquisition unit 202 transmits a request to the other radio terminal station 102. Then, the information acquisition unit acquires, as a report, information (identifier, communication system in use, used application, position information, and the like) of the other radio terminal station 102, which contains the communication state, from the other radio terminal station 102.

In Step S105, the system selection unit 207 in the radio terminal station 102 determines whether another radio terminal station 102 in which the communication state satisfies a predetermined condition is provided around the radio terminal station 102. When there is another radio terminal station 102 in which the communication state satisfies the predetermined condition, the processing proceeds to Step S106. When there is no another radio terminal station 102 in which the communication state satisfies the predetermined condition, the processing proceeds to Step S107.

In Step S106, the system selection unit 207 in the radio terminal station 102 switches the communication system. Thus, it is possible to switch the communication system from the communication system in use, in which the communication state does not satisfy the predetermined condition, to the communication system in which the communication state satisfies the predetermined condition.

In Step S107, the radio terminal station 102 ends the processing of switching the communication system. In practice, the processing returns to Step S102, and the processing operations of Step S102 to Step S106 are repeated.

In this manner, the radio terminal station 102 according to the present embodiment can monitor the communication state of the communication system used by the radio terminal station 102. When the communication state does not satisfy the predetermined threshold value, the radio terminal station 102 can select the communication system that satisfies the predetermined condition among the communication systems used by the surrounding radio terminal stations 102, and then switch the communication system to the selected communication system.

In the example in FIG. 7, when the threshold value is not satisfied in the processing of Step S103, the processing of Step S104 is performed to acquire the communication state of the surrounding radio terminal stations 102. As illustrated in Step S201 of FIG. 7, the information acquisition unit 202 in the radio terminal station 102 may perform processing of acquiring the communication state of the surrounding radio terminal stations 102 in parallel with the processing operations of Step S101 to Step S107. In this case, when the threshold value is not satisfied in the processing of Step S103, the processing of Step S105 is performed.

Second Embodiment

In the first embodiment, the communication state of the other radio terminal station 102 is obtained by directly communicating with the other radio terminal station 102 by the radio ad-hoc network or the like. In a second embodiment, information including the communication state of the other radio terminal station 102 is acquired via the radio base station 101.

Figure 8:
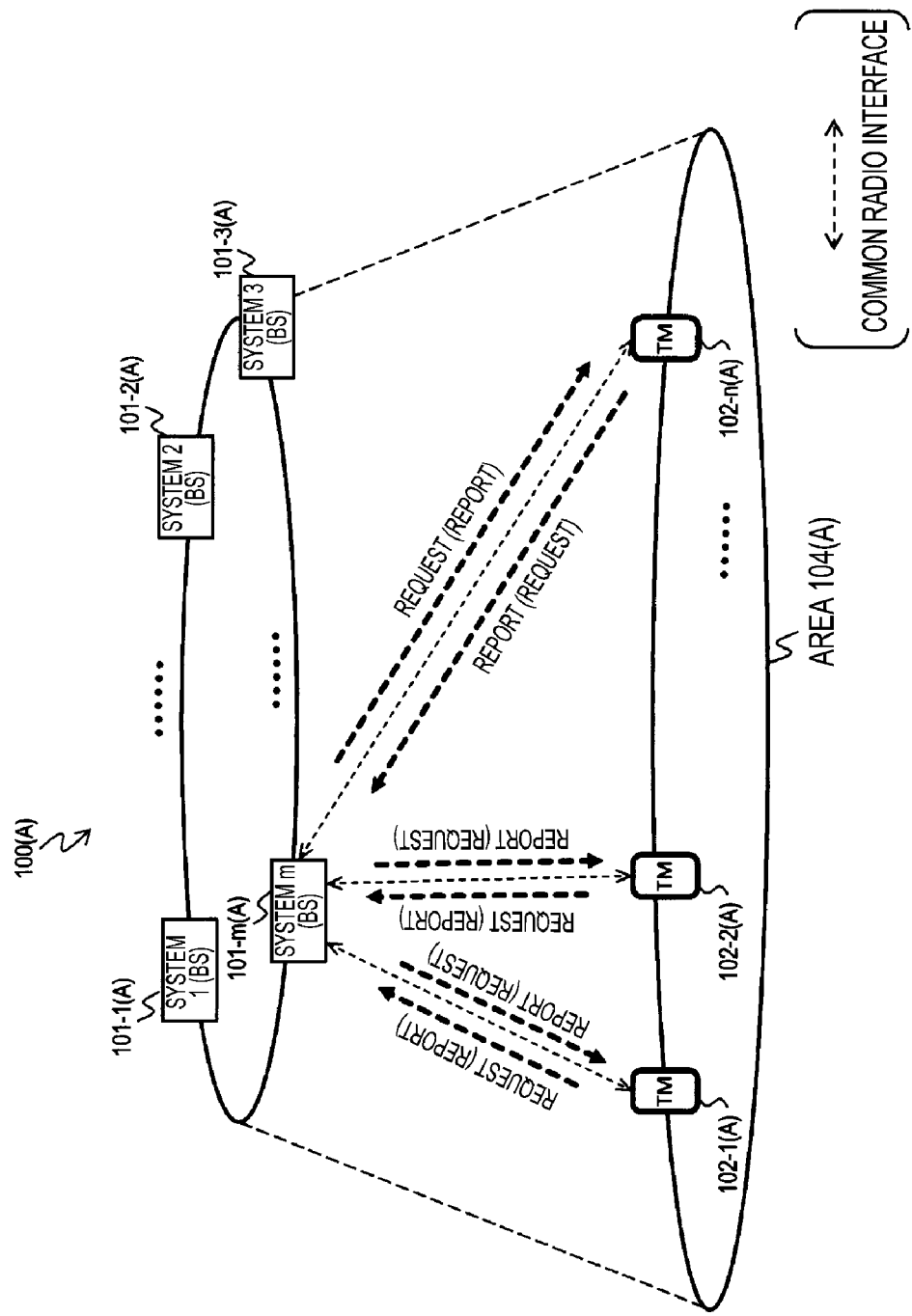
FIG. 8 is a diagram illustrating an example of a heterogeneous network according to a second embodiment.

FIG. 8 is a diagram illustrating an example of the heterogeneous network 100(A) according to the second embodiment. The heterogeneous network 100(A) in FIG. 8 corresponds to the heterogeneous network 100(A) in FIG. 1, but the arrow indicating communication with the radio base station 101 of the communication system to which the radio terminal station 102 is currently connected is omitted in FIG. 8. The communication between each of the radio terminal stations 102 and the radio base station 101 uses a common radio interface (arrow indicated by a narrow-dotted line) other than the communication system that is currently used. The radio terminal station is connected to another radio terminal station 102 via the radio base station 101 including the radio interface, by temporarily using the common radio interface other than the communication system that is currently used (using together with the current communication system), and acquires information including the communication state.

In the example in FIG. 8, the radio terminal station 102-1(A) transmits a request to the radio base station 101-*m*(A) by the common radio interface. The radio base station 101-*m*(A) transmits the request received from the radio terminal station 102-1(A) to the radio terminal station 102-2(A) and the radio terminal station 102-*n*(A) by the common radio interface. The radio terminal station 102-2(A) that has received the request from the radio base station 101-*m*(A) transmits a report including the communication state of the radio terminal station 102-2(A) to the radio base station 101-*m*(A) by the common radio interface. And the radio terminal station 102-*n*(A) that have received the request from the radio base station 101-*m*(A) transmits a report including the communication state of the radio terminal station 102-*n*(A) to the radio base station 101-*m*(A) by the common radio interface. The radio base station 101-*m* (A) receives the reports from the radio terminal station 102-2(A) and the radio terminal station 102-*n*(A), and transmits the reports to the radio terminal station 102-1(A) that has transmitted the request.

In this manner, in the second embodiment, the radio terminal station 102 can acquire the communication states of the other radio terminal stations 102 via the radio base station 101. The report returned by the radio terminal station 102 receiving the request via the radio base station 101 is similar to that in FIG. 3 described in the first embodiment. The configuration and the operation of the radio terminal station 102 are the same as that in FIGS. 4 and 7 described in the first embodiment, except that the communication unit 201 is equipped with the common radio interface, and transmits a request and receives a report via the radio base station 101.

Radio Base Station 101

Figure 9:
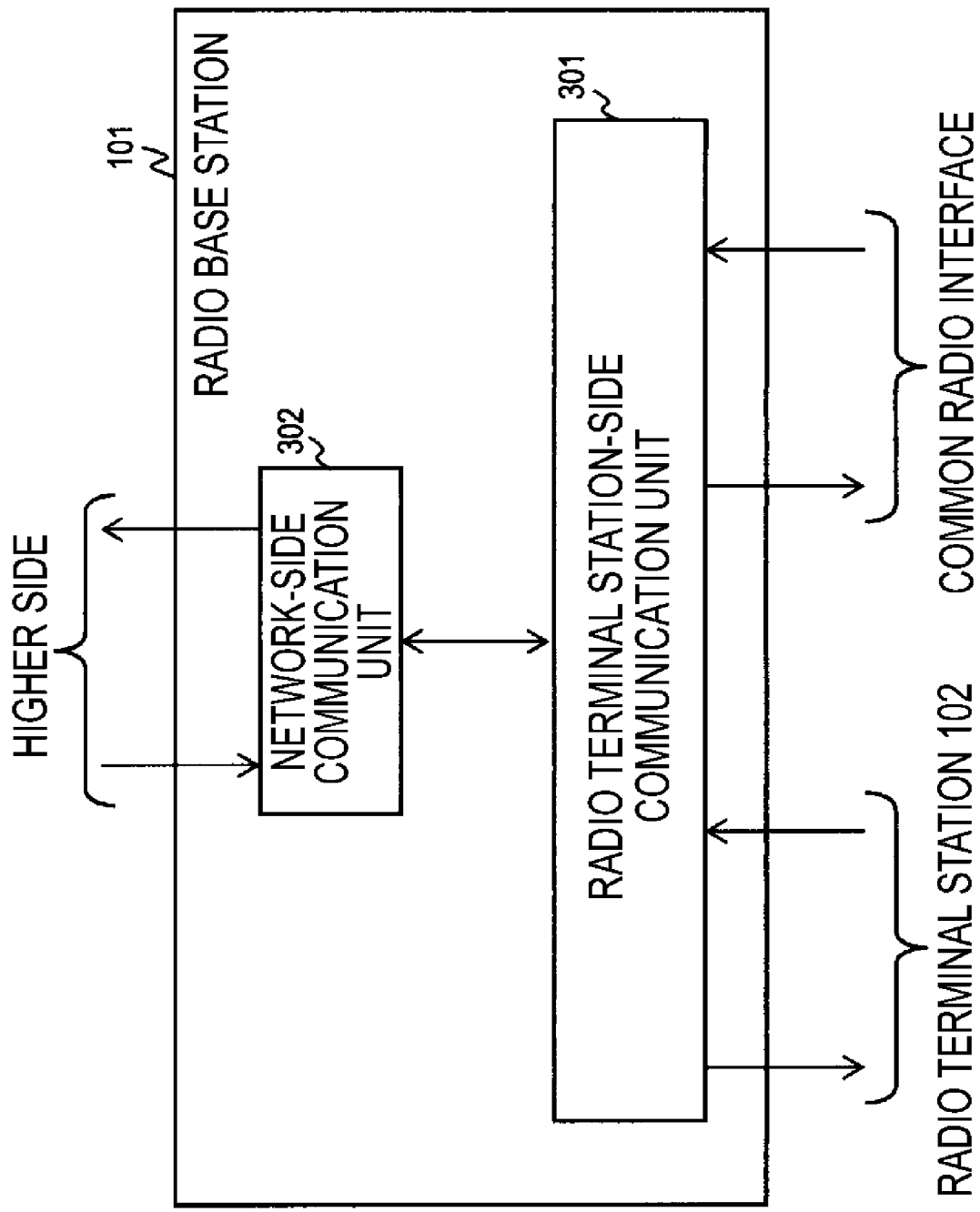
FIG. 9 is a diagram illustrating an example of a radio base station 101 corresponding to the second embodiment.

FIG. 9 illustrates an example of the radio base station 101 corresponding to the second embodiment. In FIG. 9, the radio base station 101 includes a radio terminal station-side communication unit 301 and a network-side communication unit 302, as a basic configuration. In FIG. 9, functional blocks with which a typical radio base station is equipped are omitted.

The radio terminal station-side communication unit 301 can perform radio communication with the radio terminal station 102 by a predetermined communication system. Furthermore, differing from the normal communication system, the radio terminal station-side communication unit 301 includes a radio interface common to a plurality of radio terminal stations 102.

The network-side communication unit 302 communicates with a higher device such as the management device 106 via the network 105 described with reference to FIG. 1, and relays communication between the higher device and the radio terminal station 102 that is connected to the radio terminal station-side communication unit 301.

Here, in the example of the second embodiment illustrated in FIG. 8, the radio terminal station-side communication unit 301 has functions of transferring the request received from any of the radio terminal stations 102 to the other radio terminal station 102 and transmitting the report received from the other radio terminal station 102 to the radio terminal station 102 that is a transmission source of the request. Thus, the radio terminal station 102 can acquire information including the communication states of the other radio terminal stations 102 via the radio base station 101.

In this manner, in the second embodiment, the radio terminal station 102 can transmit a request and receive a report via the radio base station 101.

The radio base station 101 may integrate and manage information such as the communication states of the radio terminal stations 102 accommodated subordinate to the radio base station 101, and the radio terminal station 102 may collectively acquire information including the communication states of the other radio terminal stations 102 from the radio base station 101.

Third Embodiment

In the first embodiment, the configuration in which the radio terminal station 102 directly communicates with another radio terminal station 102 by the radio ad-hoc network or the like to acquire the information such as the communication state of the other radio terminal station 102 has been described. In the second embodiment, the configuration in which the radio terminal station 102 acquires the information such as the communication state of another radio terminal station 102 via the radio base station 101 has been described. In contrast, in the present embodiment, the radio terminal station 102 acquires the information such as the communication states of the other radio terminal stations 102 via the management device 106 that controls a plurality of radio base stations 101 disposed in a plurality of heterogeneous networks.

As a modification example of a third embodiment described below, the management device 106 may integrate and manage the information such as the communication state of each of the radio terminal stations 102 for each area 104, and distribute reports of pieces of information of other radio terminal stations 102, which includes the communication states, from the management device 106 to the radio terminal station 102.

Figure 10:
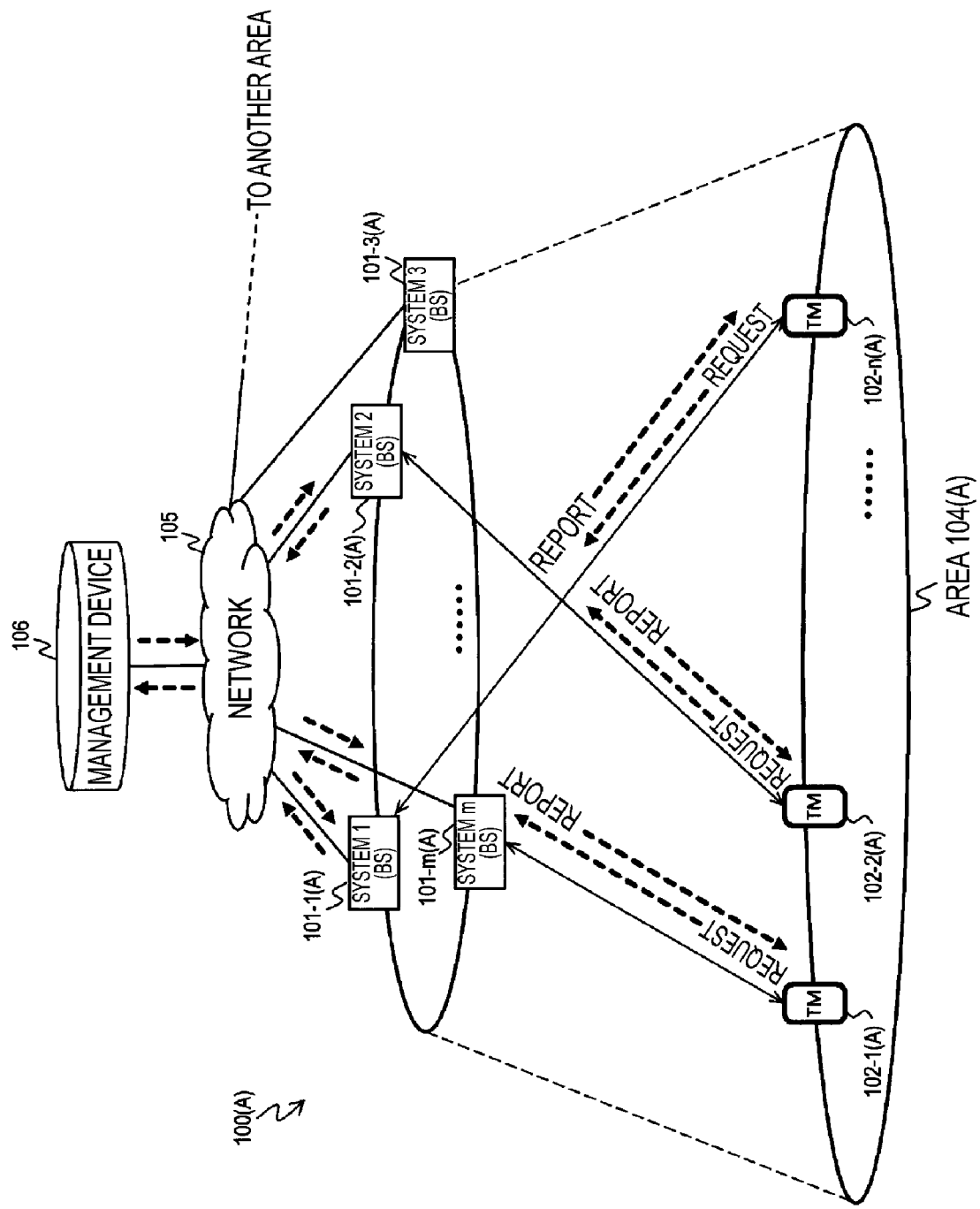
FIG. 10 is a diagram illustrating an example of a heterogeneous network according to a third embodiment.

FIG. 10 illustrates an example of the heterogeneous network 100(A) according to the third embodiment. The heterogeneous network 100(A) in FIG. 10 corresponds to the heterogeneous network 100(A) in FIG. 1, and other areas 104 such as the area 104(C) are omitted.

In FIG. 10, each of the radio terminal stations 102 is connected to the management device 106 via the network 105 from the radio base station 101 by the communication system that is currently used, and acquires the communication states from the other radio terminal stations 102 via the management device 106.

For example, in FIG. 10, when the radio terminal station 102-1(A) transmits a request of requesting the communication state of the other radio terminal station 102, the management device 106 receives the request from the radio base station 101-$m$(A) being connected, via the network 105. The management device 106 transfers the request to the other radio terminal stations 102. For example, the radio terminal station 102-$n$(A) connected to the radio base station 101-1(A) receives the request via the network 105, and the radio terminal station 102-$n$(A) returns a report including the communication state of the radio terminal station 102-$n$(A). Similarly, the radio terminal station 102-2(A) connected to the radio base station 101-2(A) also receives the request, and the radio terminal station 102-2(A) returns a report including the communication state of the radio terminal station 102-2(A). The report returned from each of the radio terminal station 102-2(A) and the radio terminal station 102-$n$(A) is relayed by the radio base station 101-2(A) and the radio base station 101-1(A) and is received again by the management device 106 via the network 105. Then, the report is transmitted from the management device 106 to the radio terminal station 102-1(A).

In this manner, the radio terminal station 102 according to the present embodiment can acquire the information including the communication states of the other radio terminal stations 102 via the management device 106. The report returned, via the radio base station 101, by the radio terminal station 102 receiving the request via the management device 106 is similar to that in FIG. 3 described in the first embodiment. The configuration and the operation of the radio terminal station 102 are the same as that in FIGS. 4 and 7 described in the first embodiment, except for passing through the management device 106.

Modification Example of Third Embodiment

In the third embodiment, the management device 106 only relays requests transmitted to the other radio terminal stations 102 by the radio terminal station 102 or reports returned from the other radio terminal stations 102. In a modification example, the management device 106 integrates and manages the information including the communication states of the radio terminal stations 102. Each of the radio terminal stations 102 collectively acquires information including communication states of a plurality of other radio terminal stations 102 from the management device 106.

Figure 11:
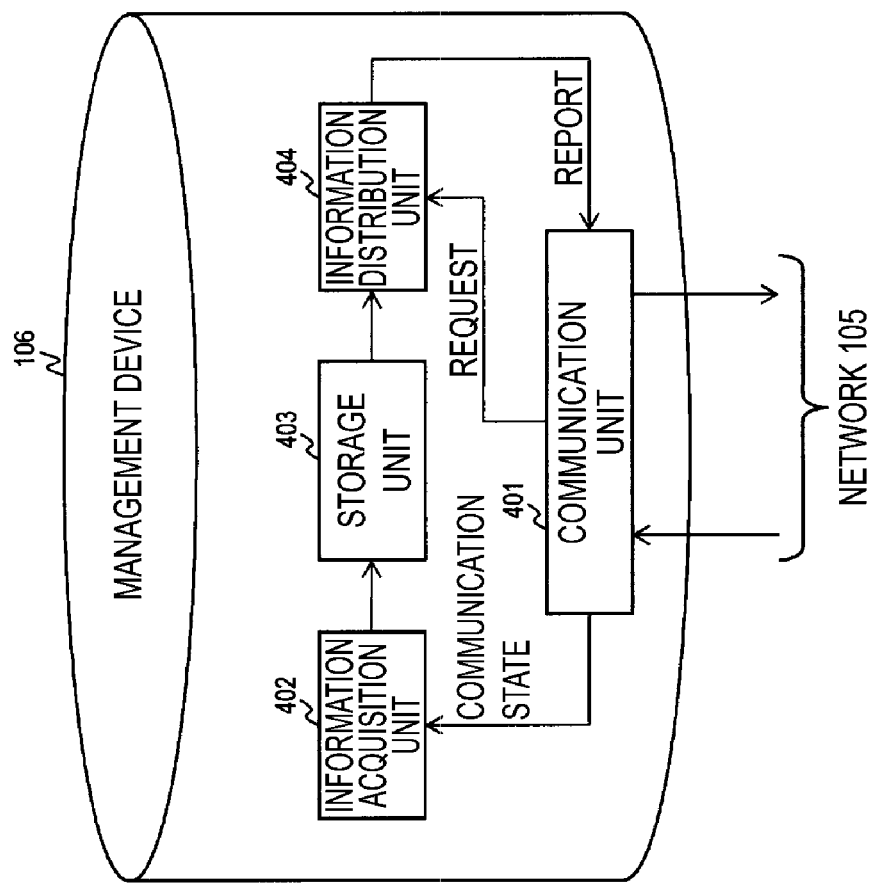
FIG. 11 is a diagram illustrating an example of a management device in a modification example of the third embodiment.

FIG. 11 illustrates an example of the management device 106 in the modification example of the third embodiment. In FIG. 11, the management device 106 includes a communication unit 401, an information acquisition unit 402, a storage unit 403, and an information distribution unit 404. In FIG. 11, functional blocks with which a typical management device is equipped are omitted.

The communication unit 401 is connected to the radio base station 101 subordinate to the management device 106 via the network 105 and communicates with the radio terminal station 102 via the radio base station 101. The communication unit 401 outputs a request received from the radio terminal station 102 to the information distribution unit 404, and transmits a report output by the information distribution unit 205 to the radio terminal station 102 that is the transmission source of the request.

The information acquisition unit 402 receives information (identifier, communication system in use, application, position information, and the like) including a communication state from each of the radio terminal stations 102 via the communication unit 401, and stores the information in the storage unit 403.

The storage unit 403 stores the information including the communication state of the radio terminal station 102, which is acquired by the information acquisition unit 402, in association with the identifier of each of the radio terminal stations 102.

When receiving the request from the radio terminal station 102, the information distribution unit 404 creates a report in which the pieces of information including the communication states of the other radio terminal stations 102 stored in the storage unit 403 are integrated, and transmits a report to the radio terminal station 102 that has transmitted the request.

In this manner, the management device 106 according to the present embodiment can integrate and manage the information including the communication states of the radio terminal stations 102, and the radio terminal station 102 can collectively acquire the information including the communication state of the other radio terminal stations 102 from the management device 106.

FIG. 12 illustrates an example of the report created by the management device 106. As illustrated in FIG. 1, the management device 106 is connected to the radio base stations 101 in the plurality of areas 104 via the network 105. Thus, the management device can integrate and collectively manage the information including the communication states of the radio terminal stations 102 in the plurality of areas 104. In the example in FIG. 12, the information indicating the type of communication system being used by each of the radio terminal station 102-1(A), the radio terminal station 102-2(A), and the radio terminal station 102-$n$(A) in the area 104(A) and the communication state of each of the radio terminal station 102-1(A), the radio terminal station 102-2 (A), and the radio terminal station 102-$n$(A) in the area 104(A) is associated with the position information and other types of information such as the application. Similarly, similar information is described for the radio terminal stations 102-1(C) and the radio terminal stations 102-2(C) in the area 104(C).

In the example of the report illustrated in FIG. 12, all of the radio terminal stations 102 in the plurality of areas 104 are illustrated. Thus, the information distribution unit 404 may return a report obtained by extracting only information regarding the radio terminal stations 102 in the area 104 which is the same as the area 104 in which the radio terminal station 102 that has transmitted the request is disposed.

As described above in the first, second, and third embodiments, the radio terminal station 102 can transmit a request of requesting a communication state of another radio terminal station 102, and receive a report of information including the communication state of the other radio terminal station 102 directly from the other radio terminal station 102 or via the radio base station 101 and the management device 106.

In this manner, the radio terminal station 102 that has acquired the pieces of information of the other radio terminal stations 102 that use different communication systems can select and switch a communication system suitable for the application used by the radio terminal station 102 among the communication systems used by the other radio terminal stations 102.

Instead of all of the radio terminal stations 102 that the radio terminal station 102 can communicate with, the transmission destination of the request may be limited to the radio terminal stations 102 that use communication systems that can satisfy the communication state required by the radio terminal station 102. For example, when the radio terminal station 102 uses the application having high real-time performance, the request for the delay for the communication system becomes high. In such a case, for example, a cellular system such as LTE and 5G, which are centralized control type and guarantee a certain degree of real-time performance, is preferable to a wireless LAN system that is an autonomous distribution type and has loose restrictions on delay. Thus, the request may not be transmitted to the radio terminal stations 102 that uses the wireless LAN system. When the radio terminal station 102 performs high capacity communication such as high definition video, the radio terminal stations 102 that use the narrow band IoT system are not appropriate, and thus may be excluded from the transmission destination of the request. The radio terminal stations 102 that use the communication systems that do not satisfy the threshold value set for the communication state of the radio terminal station 102 based on the application used by the radio terminal station 102 are not appropriate, and thus may be excluded from the destination of the request.

In this manner, the radio terminal station 102 according to the embodiments can share information including a communication state of the radio terminal device 102 with the other radio terminal stations 102 that use the plurality of communication systems. Even though the communication state of the communication system used by the radio terminal station 102 deteriorates, the radio terminal station 102 can select the communication system suitable for the used application among the communication systems used by the other radio terminal stations 102. Thus, it is possible to maintain the favorable communication quality.

It is clear that the above embodiments are merely examples of the present disclosure, and the present disclosure is not limited to the above embodiments. Thus, addition, omission, substitution, and other modifications of the constituent components may be made without departing from the spirit and scope of the present disclosure.

REFERENCE SIGNS LIST 100, 100(A), 100(C) Heterogeneous network
101 Radio base station
102 Radio terminal station
104 Area
105 Network
106 Management device
201 Communication unit
202 Information acquisition unit
203 Threshold calculation unit
204 Storage unit
205 Information distribution unit
206 Event detection unit
207 System selection unit
301 Radio terminal station-side communication unit
302 Network-side communication unit 401 Communication unit
402 Information acquisition unit
403 Storage unit
404 Information distribution unit

The invention claimed is:

1. A radio terminal station device comprising:
at least one processor; and
memory including instructions that, when executed by the at least one processor, perform to:
  select any one of a plurality of different communication systems and perform a radio communication with a radio base station device;
  acquire a communication state of a communication system of the plurality of different communication systems used by the radio terminal station device and information including at least communication states of communication systems of the plurality of different communication systems used by other radio terminal station devices,
  wherein the communication state is one of signal to noise ratio (SNR), throughput, and delay;
  calculate a threshold value for detecting deterioration of the communication state of the communication system used by the radio terminal station device;
  monitor the communication state of the communication system used by the radio terminal station device and compare the communication state of the communication system used by the radio terminal station device that is monitored with the threshold value to detect the deterioration of the communication state of the communication system used by the radio terminal station device; and
  select, when the the deterioration of the communication state of the communication system used by the radio terminal station device is detected, an optimal communication system from among the communication systems used by the other radio terminal station devices acquired and switch the communication system used by the radio terminal station device to the optimal communication system that is selected.

2. The radio terminal station device according to claim 1, wherein
the instructions, when executed by the at least one processor, further perform to calculate the threshold value to maintain the communication state required by an application used by the radio terminal station device.

3. The radio terminal station device according to claim 1, wherein the instructions, when executed by the at least one processor, further perform to
transmit a request for requesting information regarding a communication state to each of the other radio terminal station devices, and
receive a report of information including at least the communication state from each of the other radio terminal station devices.

4. The radio terminal station device according to claim 3, further comprising
a radio interface configured to directly communicate with each of the other radio terminal station devices, and
the instructions, when executed by the at least one processor, further perform to transmit the request and receive the report by the radio interface.

5. The radio terminal station device according to claim 3, further comprising
a radio interface configured to communicate with each of the other radio terminal station devices via a radio base station device, and
the instructions, when executed by the at least one processor, further perform to transmit the request and receive the report by the radio interface.

6. The radio terminal station device according to claim 3, wherein the instructions, when executed by the at least one processor, further perform to
communicate with a management station device that manages a plurality of radio base station devices in an area, and
transmit the request and receives the report via the management station device.

7. A management station device comprising:
at least one processor; and
memory including instructions that, when executed by the at least one processor, perform to:
  connect, via a network, to a plurality of radio base station devices that use a plurality of different communication systems to accommodate a plurality of radio terminal station devices;
  transfer, when a request of requesting information regarding a communication state of another radio terminal station device of the plurality of radio terminal station devices is received from a radio terminal station device of the plurality of radio terminal station devices, the request to the other radio terminal station device; and
  transmit, when a report of information including at least the communication state of the other radio terminal station device that is returned by the other radio terminal station device that is received the request is received, the report to the radio terminal station device that is a transmission source of the request;
  acquire and store information including at least communication states of the plurality of radio terminal station devices, from at least one of a radio base station device of the plurality of radio base station devices that is subordinate to the management station device or the plurality of radio terminal station devices that are subordinate to the management station device; and
  respond, when a request of requesting the communication state of the other radio terminal station device is received from the radio terminal station device, a report where the information including at least the communication states of the plurality of radio terminal station devices that are acquired are integrated to the radio terminal station device that is a transmission source of the request.

8. A radio communication system comprising
at least one processor; and
memory including instructions that, when executed by the at least one processor, perform to:
  select any one of a plurality of different communication systems and perform a radio communication with a radio base station device;
  acquire a communication state of a communication system of the plurality of different communication systems used by the radio terminal station device and information including at least communication states of communication systems of the plurality of different communication systems used by other radio terminal station devices;
  calculate a threshold value for detecting deterioration of the communication state of the communication system used by the radio terminal station device;
  monitor the communication state of the communication system used by the radio terminal station device and compare the communication state of the communication system used by the radio terminal station device that is monitored with the threshold value to detect the deterioration of the communication state of the communication system used by the radio terminal station device; and select, when the the deterioration of the communication state of the communication system used by the radio terminal station device is detected, an optimal communication system from among the communication systems used by the other radio terminal station devices acquired and switch the communication system used by the radio terminal station device to the optimal communication system that is selected, wherein the radio terminal station device selects, when deterioration of a communication state of a communication system used by the radio terminal station device is detected, an optimal communication system from among communication systems used by other radio terminal station devices based on information including at least communication states of the communication systems used by the other radio terminal station devices, and switches the communication system used by the radio terminal station device to the optimal communication system that is selected.

9. The radio terminal station device according to claim 8, wherein the instructions, when executed by the at least one processor, further perform to calculate the threshold value to maintain the communication state required by an application used by the radio terminal station device.

10. The radio terminal station device according to claim 8, wherein the instructions, when executed by the at least one processor, further perform to:

transmit a request for requesting information regarding a communication state to each of the other radio terminal station devices; and receive a report of information including at least the communication state from each of the other radio terminal station devices.

11. The radio terminal station device according to claim 10, further comprising:

a radio interface configured to directly communicate with each of the other radio terminal station devices, wherein the instructions, when executed by the at least one processor, further perform to transmit the request and receive the report by the radio interface.

12. The radio terminal station device according to claim 10, further comprising:

a radio interface configured to communicate with each of the other radio terminal station devices via a radio base station device, and wherein the instructions, when executed by the at least one processor, further perform to transmit the request and receive the report by the radio interface.

13. The radio terminal station device according to claim 10, the instructions, when executed by the at least one processor, further perform to:

communicate with a management station device that manages a plurality of radio base station devices in an area; and transmit the request and receives the report via the management station device.

14. A radio communication method in a radio communication system configured to comprise a heterogeneous network including a radio terminal station device, the radio communication method comprising:

selecting any one of a plurality of different communication systems and perform a radio communication with a radio base station device;

acquiring a communication state of a communication system of the plurality of different communication systems used by the radio terminal station device and information including at least communication states of communication systems of the plurality of different communication systems used by other radio terminal station devices;

calculating a threshold value for detecting deterioration of the communication state of the communication system used by the radio terminal station device;

monitoring the communication state of the communication system used by the radio terminal station device and comparing the communication state of the communication system used by the radio terminal station device that is monitored with the threshold value to detect the deterioration of the communication state of the communication system used by the radio terminal station device;

selecting, when the the deterioration of the communication state of the communication system used by the radio terminal station device is detected, an optimal communication system from among the communication systems used by the other radio terminal station devices acquired and switch the communication system used by the radio terminal station device to the optimal communication system that is selected; and by the radio terminal station device, selecting, when deterioration of a communication state of a communication system used by the radio terminal station device is detected, an optimal communication system from among communication systems used by other radio terminal station devices based on information including at least communication states of the communication systems used by the other radio terminal station devices, and switching the communication system used by the radio terminal station device to the optimal communication system that is selected.

15. The radio communication method according to claim 14 further comprising calculating the threshold value to maintain the communication state required by an application used by the radio terminal station device.

16. The radio communication method according to claim 14 further comprising:

transmitting a request for requesting information regarding a communication state to each of the other radio terminal station devices; and receiving a report of information including at least the communication state from each of the other radio terminal station devices.

17. The radio communication method according to claim 16 further comprising:

transmitting the request and receiving the report by a radio interface configured to directly communicate with each of the other radio terminal station devices.

18. The radio communication method according to claim 16 further comprising:

transmitting the request and receiving the report by a radio interface configured to communicate with each of the other radio terminal station devices via a radio base station device.

19. The radio communication method according to claim 16 further comprising:

communicating with a management station device that manages a plurality of radio base station devices in an area; and transmitting the request and receives the report via the management station device.

* * * * *